United States Patent [19]
Cooper

[11] Patent Number: 6,129,520
[45] Date of Patent: Oct. 10, 2000

[54] MOBILE PUMPING STATION

[75] Inventor: Peter Cooper, City Beach, Australia

[73] Assignee: Hydraplant Equipment Pty Ltd, Welshpool, Australia

[21] Appl. No.: 09/091,017

[22] PCT Filed: Dec. 6, 1996

[86] PCT No.: PCT/AU96/00794

§ 371 Date: Sep. 10, 1998

§ 102(e) Date: Sep. 10, 1998

[87] PCT Pub. No.: WO97/21878

PCT Pub. Date: Jun. 19, 1997

[30]     Foreign Application Priority Data

Dec. 8, 1995 [AU] Australia ................................. PN7045

[51] Int. Cl.[7] .............................. F04B 53/00; F04B 15/02
[52] U.S. Cl. ............................ 417/234; 417/900; 241/81
[58] Field of Search .................................... 417/234, 900; 241/81, 186.35

[56]           References Cited

U.S. PATENT DOCUMENTS

| | | | |
|---|---|---|---|
| 3,413,038 | 11/1968 | Frazier | 406/14 |
| 4,303,506 | 12/1981 | Finlay | 209/247 |
| 5,087,379 | 2/1992 | Morton et al. | 210/748 |
| 5,441,206 | 8/1995 | Schade et al. | 241/81 |

FOREIGN PATENT DOCUMENTS

| | | |
|---|---|---|
| 39448/72 | 8/1973 | Australia . |
| 03244716 | 10/1991 | Japan . |
| 03287925 | 12/1991 | Japan . |
| 04293596 | 10/1992 | Japan . |
| 1781391 | 12/1992 | U.S.S.R. . |

*Primary Examiner*—Henry C. Yuen
*Assistant Examiner*—Mahmoud M Gimie

[57]           ABSTRACT

A mobile pumping station includes a mobile base frame designed to be moved across the ground and a slurry vessel mounted on the mobile base frame and connected to a liquid supply. A primary feed hopper also mounted on the mobile base frame receives a mineral and transfers the mineral to the slurry vessel. The primary feed hopper can be adjusted to achieve a predetermined flow of the mineral to the slurry vessel so that the ratio of the mineral to the liquid can be controlled. The mobile pumping station can be moved into a position adjacent a mineral deposit such that a portion of the mineral deposit can be loaded into the slurry vessel. The mineral is formed into a flowable slurry by combining liquid from the liquid supply with the mineral, and thereafter the flowable slurry is discharged from the vessel via a slurry pump.

24 Claims, 2 Drawing Sheets

MOBILE PUMPING STATION

FIELD OF THE INVENTION

The present invention relates generally to a mobile pumping station used for moving a mineral deposit and relates particularly, though not exclusively, to a track mounted pumping station. Typically, the present invention relates to a track mounted pumping station having a turntable rotatably mounted to a mobile base frame.

BACKGROUND OF THE INVENTION

Currently there are at least two techniques for dredging or excavating sand or other mineral deposits. The first of these techniques involves onshore removal of the mineral using an excavator which then loads a truck. The truck transports the mineral for dumping or processing elsewhere. For example, some mineral sands in Western Australia are currently mined using this technique and then trucked to a processing plant for concentration of titaniferous ores contained within the mineral deposit. Some of the drawbacks with this technique include: the relatively high transportation costs; the fact that trucks require expensive pavement surfaces under their wheels; problems with dust control; and expense associated with road maintenance. Furthermore, trucks have often to take a long route around obstacles, and the tipped load from the trucks then has to be handled to its end use.

Dredges have also been widely used for the removal of sand or other mineral deposits from locations where water exists in abundance. Generally, the dredge is mounted on or as a barge which is then located in water at the site of the mineral deposit. The dredge progressively excavates mineral from the beach or other mineral deposit by slewing a rotating cutter head from side to side across a face of the deposit. The cutter head excavates the mineral and a slurry pump sucks up the mineral and pumps it via a pipeline to another location, such as a mineral sand concentrating plant. However, a relatively large volume of water is transported with the mineral deposit using the slurry pump. In locations where water is scarce, the water must be recycled to a dredge pit.

The volume of water retained with the mineral cannot be accurately controlled by dredging and inevitably excessive water is often pumped with the mineral. Thus, a relatively large amount of energy is expended pumping water rather than mineral. Although a certain amount of water is required together with the mineral to provide a pumpable slurry, this ratio often cannot be accurately controlled when dredging. Consequently, pumping costs are relatively high and, particularly where the slurry is to be pumped a long distance, may be prohibitive.

SUMMARY OF THE INVENTION

An intention of the present invention is to provide a mobile pumping station which can cost effectively be used to move relatively large volumes of a mineral within a slurry at a controlled mineral to liquid ratio.

According to the present invention there is provided a mobile pumping station comprising:

a mobile base frame designed to be moved across the ground;

a slurry vessel mounted to the mobile base frame and adapted to receive a mineral, the slurry vessel operatively connected to a liquid supply; and a slurry pump coupled to an outlet of the slurry vessel whereby, in use, the mobile pumping station can move into position adjacent a mineral deposit and a portion of the mineral deposit can then be loaded into the slurry vessel wherein said mineral portion is formed into a flowable slurry by combining liquid from the liquid supply with said mineral portion, said slurry thus having a controlled mineral to liquid ratio, and thereafter the flowable slurry discharged from the vessel via the slurry pump.

Preferably, the mobile pumping station further comprises a primary feed hopper also mounted to the mobile base frame, the primary feed hopper adapted to receive a mineral and transfer said mineral to the slurry vessel so that, in use, the primary feed hopper can be adjusted to achieve a predetermined flow of said mineral to the slurry vessel and thus the ratio of said mineral to the liquid can be controlled.

Typically, the pumping station further comprises feeding means movably coupled to the base of the primary feed hopper so that, in use, the feeding means can be adjusted to control the flow of mineral to the slurry vessel. More typically, the feeding means comprises a push feeder slidably coupled to the primary feed hopper wherein the rate of reciprocation of the push feeder relative to the primary feed hopper determines the flow of mineral to the slurry vessel. Advantageously, by controlling the flow of mineral to the slurry vessel the ratio of mineral to liquid can be adjusted in the slurry vessel, and thus the ratio of mineral to liquid substantially optimised for pumping of the slurry. Typically, the flow of liquid to the slurry vessel is also adjusted so that the ratio of mineral to liquid is substantially optimised for pumping of the slurry.

Typically, the mobile pumping station also includes a secondary feed hopper located adjacent the feeding means, the secondary feed hopper designed to receive mineral from the feeding means. More typically, the mobile pumping station further comprises flow control means movably coupled to the secondary feed hopper so as to control the flow of mineral through said hopper. In one example, the flow control means consists of one or more weighted paddles which are pivotally coupled to the secondary feed hopper. The secondary feed hopper and the flow control means together control the flow of mineral to the slurry vessel this being particularly advantageous with relatively wet minerals.

Typically, the mobile pumping station further comprises a primary conveyor system mounted to the mobile base frame wherein the primary conveyor system operatively interconnects the feed hopper and the slurry vessel so that, in use, mineral is transferred from the primary and/or secondary feed hopper to the slurry vessel via the primary conveyor system. Preferably, the primary conveyor system comprises an endless conveyor belt fitted around a head drum and a tail drum with a series of idler rollers positioned therebetween. In one example, a conveying surface of the endless conveyor belt is cleated wherein improved footing is provided for minerals being carried along the conveying surface. In this example, the minerals are probably in a wet condition.

In one example the mobile pumping station further comprises one or more nozzles operatively connected to the liquid supply and located adjacent a return run of the endless conveyor belt so that, in use, said one or more nozzles can provide a jet of water against a conveying surface of said return run of the conveyor belt so as to substantially clean minerals retained on said surface.

Preferably, the primary conveyor system is mounted in an inclined plane, to the mobile base frame wherein the tail drum is located beneath the feed hopper and the head drum disposed above the slurry vessel. The incline of the primary conveyor is selected to convey relatively wet minerals.

Preferably, the primary and secondary feed hoppers, primary conveyor system, and slurry vessel are all pivotally mounted to the mobile base frame about a common vertical axis thereof whereby, in use, the feed hopper can be pivoted relative to the base frame so as to reposition the primary and secondary feed hoppers relative to a mineral deposit without having to move the mobile base frame across the ground.

Typically, the mobile pumping station further comprises a turntable rotatably mounted to the base frame, the turntable fixedly connected to a support structure to which the primary and secondary feed hoppers, primary conveyor system, and slurry vessel are connected. In one example, the slurry pump is also fixedly connected to the support structure so that the slurry pump, primary and secondary feed hoppers, primary conveyor system, and slurry vessel are all mobile as an integral structure.

In another embodiment the mobile pumping station further comprises a primary screen connected to an upper portion of the primary feed hopper and adapted to size mineral passing into and through said hopper wherein oversize mineral is retained on the primary screen and undersize mineral fed through the primary feed hopper. The primary screen is sized such that any mineral allowed to pass said screen is of a conveyable size to the secondary screen.

Typically, the primary screen is pivotally coupled to the primary feed hopper so that, in use, the oversize mineral can be tipped from said screen. Preferably, the primary screen is a grizzly screen having a plurality of spaced parallel bars defining therebetween a series of spaces, of a predetermined size, through which the undersize mineral passes. In one embodiment, the primary screen is tipped hydraulically by remote control.

Typically, the mobile pumping station further comprises a secondary screen coupled to the slurry vessel, said screen designed to size mineral passing into and through said vessel whereby oversize mineral is retained on the secondary screen and undersize mineral fed into the slurry vessel. Generally, the secondary screen is a vibrating screen. The secondary screen is sized so that any mineral fed to the slurry vessel via said screen is unlikely to block or obstruct the slurry pump. In one example, the secondary screen is one of a series of secondary screens arranged in multiple decks. Generally, the mobile pumping station includes one or more wash bars disposed above the secondary screen, the wash bars designed to receive and distribute water over mineral passing across the secondary screen. Alternatively, the secondary screen is a trommel-type rotary screen.

In one example, the mobile pumping station further comprises a crusher designed to receive oversize mineral retained on the secondary screen, said mineral being crushed and then returned to the primary conveyor system for further sizing via the secondary screen. In one such embodiment the pumping station also comprises a secondary conveyor system operatively communicating with the crusher so that oversize mineral is returned to the primary conveyor system and the secondary screen via the secondary conveyor system.

Typically, the mobile pumping system station also comprises a first inlet pipe coupled to the liquid supply and connected to the slurry vessel so as to provide a turbulent flow of liquid and slurry in the slurry vessel wherein minerals within the slurry are continuously moved through said vessel to substantially inhibit the build-up or deposit of minerals on the vessel walls. More typically, the first inlet pipe is connected at an acute angle to the vessel whereby a turbulent flow of the liquid and slurry is effected in the slurry vessel.

In another embodiment the mobile pumping station further comprises a second inlet pipe also coupled to the liquid supply, the second inlet pipe being in liquid communication with the slurry vessel and having an outlet directed toward a bottom section of the slurry vessel to promote turbulence within the slurry vessel so as to substantially inhibit the build-up or deposit of minerals on the vessel walls. Preferably, a liquid control valve is coupled to both the first and second inlet pipes so as to control the relative flows of liquid to the slurry vessel via said first and second inlet pipes.

Preferably, the mobile pumping station includes a launder set connected to the slurry vessel and designed to collect excess water or slurry overflowing the slurry vessel. Typically, the launder set has a chute positioned beneath the primary conveyor system, the chute designed to release excess water or slurry from the launder set and clear any mineral spillages from the primary conveyor system.

Typically, the liquid from the liquid supply is water wherein the liquid supply is an ocean, an estuary, a lake, a river, or other water supply.

Mineral is to be understood to include soil, mud, sand, stones, rocks, ores, other substantially solid particulate matter obtained from the ground, or any combination thereof. Slurry is to be understood as meaning a suspension of a mineral within a liquid. Typically, the mineral to liquid ratio of the slurry is such that the mineral within the slurry can be transported or pumped through a pipeline.

BRIEF DESCRIPTION OF THE DRAWINGS

In order to achieve a better understanding of the nature of the present invention a preferred embodiment of a mobile pumping station will now be described in some detail, by way of example only, with reference to the accompanying drawings in which.

DETAILED DESCRIPTION OF THE PREFERRED EMBODIMENTS

Figure 1:
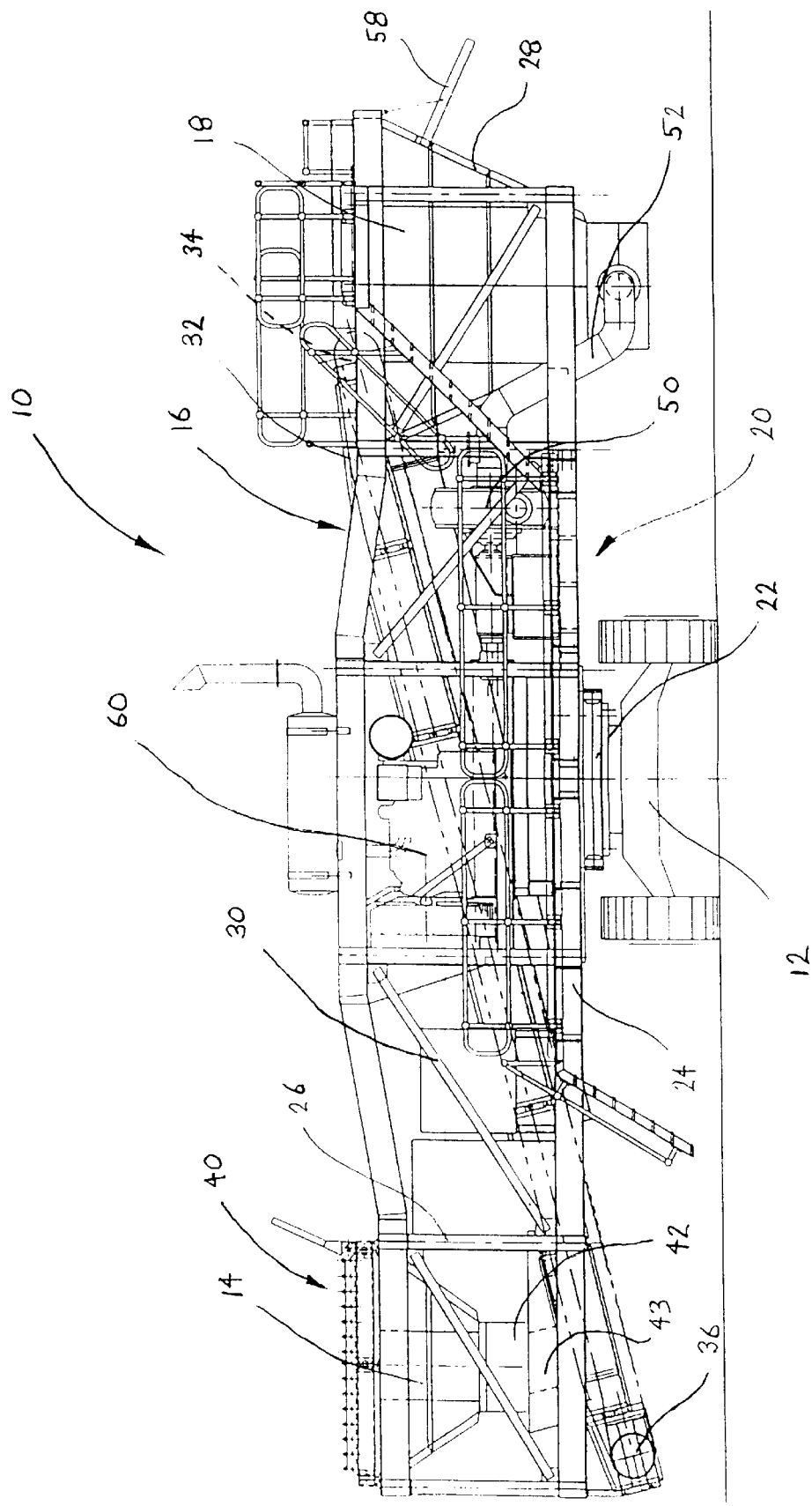
FIG. 1 is a side elevational view of a mobile pumping station.

As best shown in FIG. 1 there is a mobile pumping station shown generally as 10 comprising a mobile base frame 12, a primary feed hopper 14, a primary conveyor system 16, and a slurry vessel 18. The primary feed hopper 14, primary conveyor system 16, and slurry vessel 18 are all mounted to a support structure shown generally as 20. The support structure 20 is fixedly connected to a turntable 22 which is rotatably mounted to the mobile base frame 12.

The support structure 20 essentially comprises a rectangular frame 24 having at one end a feed hopper support structure 26, and at an opposite end a slurry vessel support structure 28. At opposite ends of the rectangular frame 24 the primary feed hopper 14 and slurry vessel 18 are connected to their respective support structures 26, 28. A conveyor belt support structure shown generally as 30 is also connected to the rectangular frame 24 between the primary feed hopper 14 and slurry vessel 18. The conveyor system support structure 30 connects the conveyor belt system 16 to the rectangular frame 24 in an inclined plane.

In this example, the primary conveyor system 16 comprises an endless conveyor belt 32 fitted around a head drum 34 and a tail drum 36 with a series of idler rollers (not shown) positioned therebetween. The tail drum 36 is located beneath the primary feed hopper 14 and the head drum 34 located above the slurry hopper 18. Thus, the primary feed hopper 14 can transfer mineral to the primary conveyor system 16 and in turn the conveyor system 16 can transport mineral to the slurry vessel 18.

The primary feed hopper 14 is constructed in the shape of a pyramidal frustum and mounted to the feed hopper support structure 26 in an inverted position. A primary screen, in this example a grizzly 40, is pivotally connected to either the hopper support structure 26 or the primary hopper 14 itself. The grizzly 40 thus serves to screen mineral which enters the primary hopper 14.

A lower end of the primary hopper 14 is slidably engaged by a push feeder 42. The push feeder 42 reciprocates relative to the primary hopper 14 so as to meter or control the flow of mineral from the primary hopper 14 which then passes to a secondary feed hopper 43. It should be appreciated that other types of feeders, such as vibratory feeders, may be used. The secondary feed hopper 43 is located beneath the push feeder 42 and receives mineral being fed from said feeder 42. A series of weighted paddles (not shown) pivotally connect to the secondary feed hopper 43 and control the flow of mineral through the secondary hopper 43. This design is well suited for relatively wet minerals which are fed through the push feeder 42.

Figure 2:
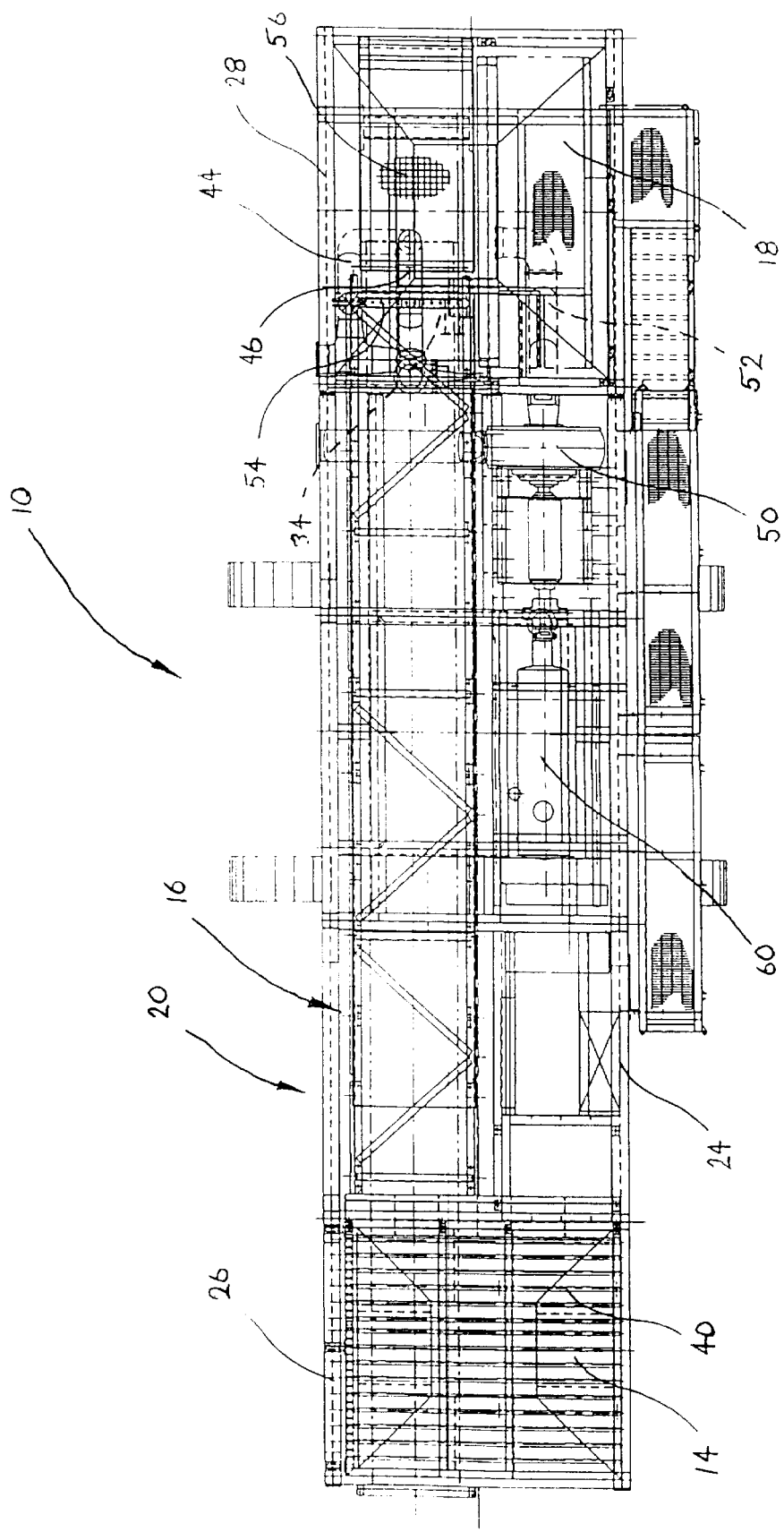
FIG. 2 is a plan view of the mobile pumping station shown in FIG. 1.

The slurry vessel 18 is also shaped in the form of a pyramidal frustum and is mounted to the slurry vessel support structure 28 in an inverted position. The slurry vessel 18 has connected to it a liquid supply via a pipeline which is split into first and second inlet pipes 44, 46 respectively (depicted in FIG. 2 only). The first inlet pipe 44 is connected to the slurry vessel 18 via a flange fitting so that the first inlet pipe 44 directs liquid around a periphery of the slurry vessel 18. The second inlet pipe 46 connects to the slurry vessel 18 through a wall of the vessel 18 and has an outlet directed toward a bottom section of the slurry vessel 18. The liquid flow from the outlet of the second inlet pipe 46 is directed so as to promote a turbulent flow of liquid and slurry within the slurry vessel 18. Two control valves (not shown) are provided between the first and second inlet pipes 44, 46 so as to control the relative flows of liquid to the slurry vessel 18 via the first and second inlet pipes 44, 46.

Liquid, in this example water, is pumped from the ocean or another water supply which is located nearby. A water supply pump is provided on land for pumping water to the slurry vessel 18. A flexible hose and pipeline system (not shown) is coupled between the water supply pump and the slurry vessel 18, downstream of the water supply pump.

In this embodiment the mobile pumping system 10 further comprises a relatively large slurry pump 50 used to pump slurry from the base of the slurry vessel 18 via a slurry discharge line 52. The slurry pump 50 is mounted to the rectangular frame 24 adjacent the slurry vessel 18.

Another flexible hose is provided between an outlet of the slurry pump 50 and a slurry pipeline located on the ground. In this example, both flexible hoses are supported by a boom (not illustrated) which is connected to and extends from the support structure 20. Thus, the flexible tubes allow the support structure 20 and associated equipment to rotate relative to the mobile base frame 12.

A spray tube 54 (depicted in FIG. 2 only) having a series of nozzles is connected to the second inlet pipe 46 underneath the head drum 34. The spray nozzles are directed toward a conveying surface of the conveyor belt 32 on a return run of the conveyor system 16. Thus, a portion of the water flowing to the slurry vessel 18 via the second inlet pipe 46 is diverted to the spray pipe 54 for cleaning of the conveyor belt 32.

A launder set (not illustrated) is disposed about the perimeter of the slurry vessel 18, the launder set designed to collect excess water or slurry overflowing said vessel 18. The launder set includes a chute (not shown) provided beneath an upper end of the return run of the conveyor belt 32, the chute used to collect excessive wash water which deflects from the conveyor belt 32 during washing thereof. This excess water and/or slurry cleans away any excess mineral spillage from the primary conveyor return underside.

The mobile pumping station 10 further comprises a secondary screen 56 (shown in FIG. 2 only) coupled to the slurry vessel support structure 28. In this embodiment the secondary screen 56 is of a mesh-type and is located above the slurry vessel immediately beneath the head drum 34 of the primary conveyor system 16. The secondary screen 56 is a vibratory screen. In an alternative embodiment the secondary screen 56 may be one of a series of screens arranged in multiple decks. The pumping station 10 includes a series of wash bars (not depicted) disposed above the secondary screen 56. The wash bars receive a portion of the water flowing to the slurry vessel 18 and spray this water over mineral passing across the secondary screen 56. Thus, particularly sticky fines such as those present in mineral sands are washed through the secondary screen 56.

In yet a further embodiment, a trommel-type rotary screen may be used to size mineral passing from the primary conveyor system 16 into the slurry vessel 18. The secondary screen 56 is sized to prevent oversize mineral which is likely to block or obstruct the slurry pump 50 from entering the slurry vessel 18.

An oversize mineral chute 58 (illustrated in FIG. 1 only) is connected to the slurry vessel support structure 28, said chute 58 being designed to direct oversize mineral passing over the secondary screen 56 from the pumping station 10. In a further example, the pumping station 10 may include a crusher (not illustrated) mounted on the support structure 20. The crusher may be a jaw, roll, or cone crusher and is designed to receive and crush oversize mineral passing over the secondary screen 56. The crushed oversize mineral may then be returned to the primary conveyor system via a secondary conveyor system.

The mobile pumping station 10 also comprises a power plant shown generally as 60. The power plant 60 powers the push feeder 42, the primary conveyor system 16, the slurry pump 50, and the mobile base frame 12. The power plant 60 can be either diesel or electric. In this example, the mobile base frame 12 is track mounted being adapted from conventional excavating machinery.

Operation of the mobile pumping station 10 described above will now be explained in some detail. In this example, the mobile pumping station 10 is used to move predominantly sand from a beach area that is being excavated. However, it will be appreciated that the invention is not limited to this application but may include the pumping of practically any mineral from a mineral deposit.

The mobile pumping station 10 is moved across the beach to a location adjacent an area where sand is to be excavated from the beach. Generally, an excavator or wheel loader is then used to dig sand from the beach and load the sand into the feed hopper 14. The primary screen or grizzly 40, having predetermined spaces between adjacent bars, retains any oversize material which may be dug from the beach. Undersize mineral passes through the grizzly 40 to the base of the primary hopper 14.

The push feeder 42 moves in a reciprocating motion relative to the primary hopper 14. The rate at which the push feeder 42 reciprocates can be controlled so that a metered flow of sand passes from the hopper 14 into the secondary hopper 43. A movable gate (not shown) exists at the outlet of the primary hopper 14 and feeder 42. This also is used to meter the flow of sand into the secondary hopper 43. Sand being fed from the primary hopper 14 into the secondary hopper 43 flows to the conveyor belt 32 via the weighted paddles. Thus, the flow of sand to the slurry vessel 18 is controlled by the push feeder 42 and weighted paddles.

The primary conveyor system 16 carries the mineral to above the slurry vessel 18. The conveyor belt 32 is cleated to improve footing of the sand to the inclined conveyor belt 32 surface and in particular wet sand which is dug from below water level. Sand is then dropped from the primary conveyor system 16 at the head drum 34, onto the secondary screen 56 and then into the slurry vessel 18. Only undersize mineral passes through the secondary screen 56 and into the slurry vessel 18, oversize mineral being retained on the screen 56. The oversize mineral can then be crushed and returned to the primary conveyor system 16. Crushing of the oversize mineral may be effected by any suitable crusher including a jaw, roll, or cone crusher.

A predetermined flow of water is pumped into the slurry vessel 18 via the first and second inlet pipes 44, 46, respectively. The quantity of water pumped to the slurry vessel 18 is controlled so that the resulting slurry can be pumped from the slurry vessel 18 via the slurry pump 50. Thus, the ratio of mineral to water in the slurry vessel 18 can be controlled by the push feeder 42 and the flow of water to the slurry vessel 18. In this way the ratio of mineral to water pumped from the mobile pumping station 10 is substantially optimised. Sufficient water is added to the mineral so that the slurry is in a flowable form. Similarly, the speed of the conveyor belt 32 and reciprocation speed of the push feeder 42 can be controlled to maximise mineral passing through the mobile pumping station 10.

Slurry is pumped from the base of the slurry vessel 18 using the slurry pump 50 via the slurry line 52. In this example, an outlet of the slurry pump 50 is connected to the flexible hose which is suspended from the boom connected to the support structure 16. The slurry of predominantly sand is then pumped away or deposited in another location.

As the beach portion adjacent the feed hopper 14 is excavated the support structure 16 can be pivoted relative to the mobile base frame 12 so as to conveniently locate the feed hopper 14 adjacent the next section of beach to be excavated. Thus, the excavator can reach the feed hopper 14 whilst covering a large area when digging sand from the beach and loading it into the feed hopper 14. The mobile pumping station 10 can then move via the track mounted base frame 12 to another location on the beach. The support structure 16 and associated equipment is then pivoted relative to the mobile base frame 12 so that the feed hopper 14 is once again located adjacent the section to be dug. This process is repeated until the required area of the beach is excavated. A series of pipe strings of a predetermined length are coupled to both the water inlet and slurry outlet lines as required.

The mobile pumping station 10 can then conveniently be loaded on a semi-trailer and transported to the next location to be mined.

Now that a preferred embodiment of the invention has been described in some detail it will be apparent to those skilled in the relevant arts that the mobile pumping station has at least the following advantages over the admitted prior art:

(i) the mobile pumping station can be moved adjacent a mineral deposit with relative ease;

(ii) the mobile pumping station can be adapted to excavate a relatively large area of mineral deposit expeditiously;

(iii) the mobile pumping station can be used to optimise the ratio of mineral to liquid which is pumped in the form of a slurry thereby minimising costs;

(iv) the mobile pumping station is particularly versatile and can be used in a variety of applications;

(v) the mobile pumping station optimises use of water resources in areas where water is not abundant; and (vi) the mobile pumping station is self-contained.

Those skilled in the relevant arts will appreciate that the invention described herein is susceptible to variations and modifications other than those specifically described. For example, the specific equipment described may be substituted with other devices which perform the same function and still remain within the scope of the present invention. Furthermore, the mobile pumping station may comprise only a slurry vessel which is loaded with mineral from an excavator, although this embodiment is not preferred. The mobile pumping station may be mounted on wheels rather than tracks as herein described. All such variations and modifications are to be considered within the scope of the present invention the nature of which is to be determined from the foregoing description.

What is claimed is:

1. A mobile pumping station comprising:

a mobile base frame designed to be moved across the ground;

a slurry vessel mounted to the mobile base frame and adapted to receive a mineral, the slurry vessel operatively connected to a liquid supply;

means for controlling the flow of mineral into the slurry vessel, said means mounted to the mobile base frame; and a slurry pump coupled to an outlet of the slurry vessel, the mobile pumping station being moveable into position adjacent a mineral deposit such that a portion of the mineral deposit is loadable into the slurry vessel, wherein said mineral portion is formed into a flowable slurry by combining liquid from the liquid supply with said mineral portion, said slurry thus having a controlled mineral to liquid ratio, and thereafter the flowable slurry discharged from the vessel via the slurry pump.

2. A mobile pumping station as defined in claim 1, wherein the means for controlling the flow of mineral into the slurry vessel includes a primary feed hopper also mounted to the mobile base frame, the primary feed hopper being adapted to receive a mineral and transfer said mineral to the slurry vessel, the primary feed hopper being adjustable to achieve a predetermined flow of said mineral to the slurry vessel so that the ratio of said mineral to the liquid can be controlled.

3. A mobile pumping station as defined in claim 2, wherein the means for controlling the flow of mineral into the slurry vessel further includes feeding means movably coupled to the base of the primary feed hopper so that, in use, the feeding means can be adjusted to control the flow of mineral to the slurry vessel.

4. A mobile pumping station as defined in claim 3 wherein the feeding means comprises a mechanical feeder coupled to the primary feed hopper, wherein the rate of reciprocation of the mechanical feeder relative to the primary feed hopper determines the flow of mineral to the slurry vessel.

5. A mobile pumping station as defined in claim 3 further comprising a secondary feed hopper located adjacent the feeding means, the secondary feed hopper designed to receive mineral from the feeding means.

6. A mobile pumping station as defined in claim 5 additionally comprising flow control means movably coupled to the secondary feed hopper so as to control the flow of mineral through said hopper.

7. A mobile pumping station as defined in claim 5 further comprising a primary conveyor system mounted to the mobile base frame wherein the primary conveyor system operatively interconnects the primary and secondary feed hoppers, and the slurry vessel so that, in use, mineral is transferred from the feed hopper to the slurry vessel via the primary conveyor system.

8. A mobile pumping station as defined in claim 7 wherein the primary conveyor system comprises an endless conveyor belt fitted around a head drum and a tail drum with a series of idler rollers positioned therebetween.

9. A mobile pumping station as defined in claim 8 further comprising one or more nozzles operatively connected to the liquid supply and located adjacent a return run of the endless conveyor belt so that, in use, said one or more nozzles can provide a jet of water against a conveying surface of said return run of the conveyor belt so as to substantially clean minerals retained on said surface.

10. A mobile pumping station as defined in claim 8 wherein the primary conveyor system is mounted in an inclined plane to the mobile base frame wherein the tail drum is located beneath the feed hopper and the head drum disposed above the slurry vessel.

11. A mobile pumping station as defined in claim 7 wherein the primary and secondary feed hoppers, primary conveyor system, and slurry vessel are all pivotally mounted to the mobile base frame about a common vertical axis thereof whereby, in use, the feed hoppers can be pivoted relative to the base frame so as to reposition the feed hoppers relative to a mineral deposit without having to move the mobile base frame across the ground.

12. A mobile pumping station as defined in claim 11 further comprising a turntable rotatably mounted to the base frame, the turntable fixedly connected to a support structure to which the feed hoppers, primary conveyor system, and slurry vessel are connected.

13. A mobile pumping station as defined in claim 2 further comprising a primary screen connected to an upper portion of the primary feed hopper and adapted to size mineral passing into and through said hopper wherein oversize mineral is retained on the primary screen and undersize mineral fed through the primary feed hopper.

14. A mobile pumping station as defined in claim 13 wherein the primary screen is pivotally coupled to the primary feed hopper so that, in use, the oversize mineral can be tipped from said screen.

15. A mobile pumping station as defined in claim 7 further comprising a secondary screen coupled to the slurry vessel, said screen designed to size mineral passing into and through said vessel whereby oversize mineral is retained on the secondary screen and undersize mineral fed into the slurry vessel.

16. A mobile pumping station as defined in claim 15 wherein the secondary screen is one of a series of secondary screens arranged in multiple decks.

17. A mobile pumping station as defined in claim 15 also including one or more wash bars disposed above the secondary screen, said wash bars designed to receive and distribute water over mineral passing across the secondary screen.

18. A mobile pumping station as defined in claim 15 wherein the secondary screen is a trommel-type rotary screen.

19. A mobile pumping station as defined in claim 15 further comprising a crusher designed to receive oversize mineral retained on the secondary screen, said mineral being crushed and then returned to the primary conveyor system for further sizing via the secondary screen.

20. A mobile pumping station as defined in claim 19 further comprising a secondary conveyor system operatively communicating with the crusher so that oversize mineral is returned to the primary conveyor system and the secondary screen via the secondary conveyor system.

21. A mobile pumping station as defined in claim 1 further comprising a first inlet pipe coupled to the liquid supply and connected to the slurry vessel so as to provide a turbulent flow of liquid and slurry in the slurry vessel wherein minerals within the slurry are continuously moved through said vessel to substantially inhibit the build-up or deposit of minerals on the vessel walls.

22. A mobile pumping station as defined in claim 21 further comprising a second inlet pipe also coupled to the liquid supply, the second inlet pipe being in liquid communication with the slurry vessel and having an outlet directed toward a bottom section of the slurry vessel to promote turbulence within the slurry vessel so as to substantially inhibit the build-up or deposit of minerals on the vessel walls.

23. A mobile pumping station as defined in claim 22 further comprising a liquid control valve coupled to both the first and second inlet pipes so as to control the relative flows of liquid to the slurry vessel via said first and second inlet pipes.

24. A mobile pumping station as defined in claim 4, wherein the mechanical feeder is a push feeder slidably coupled to the primary feed hopper.

\* \* \* \* \*